United States Patent Office 2,698,390
Patented Dec. 28, 1954

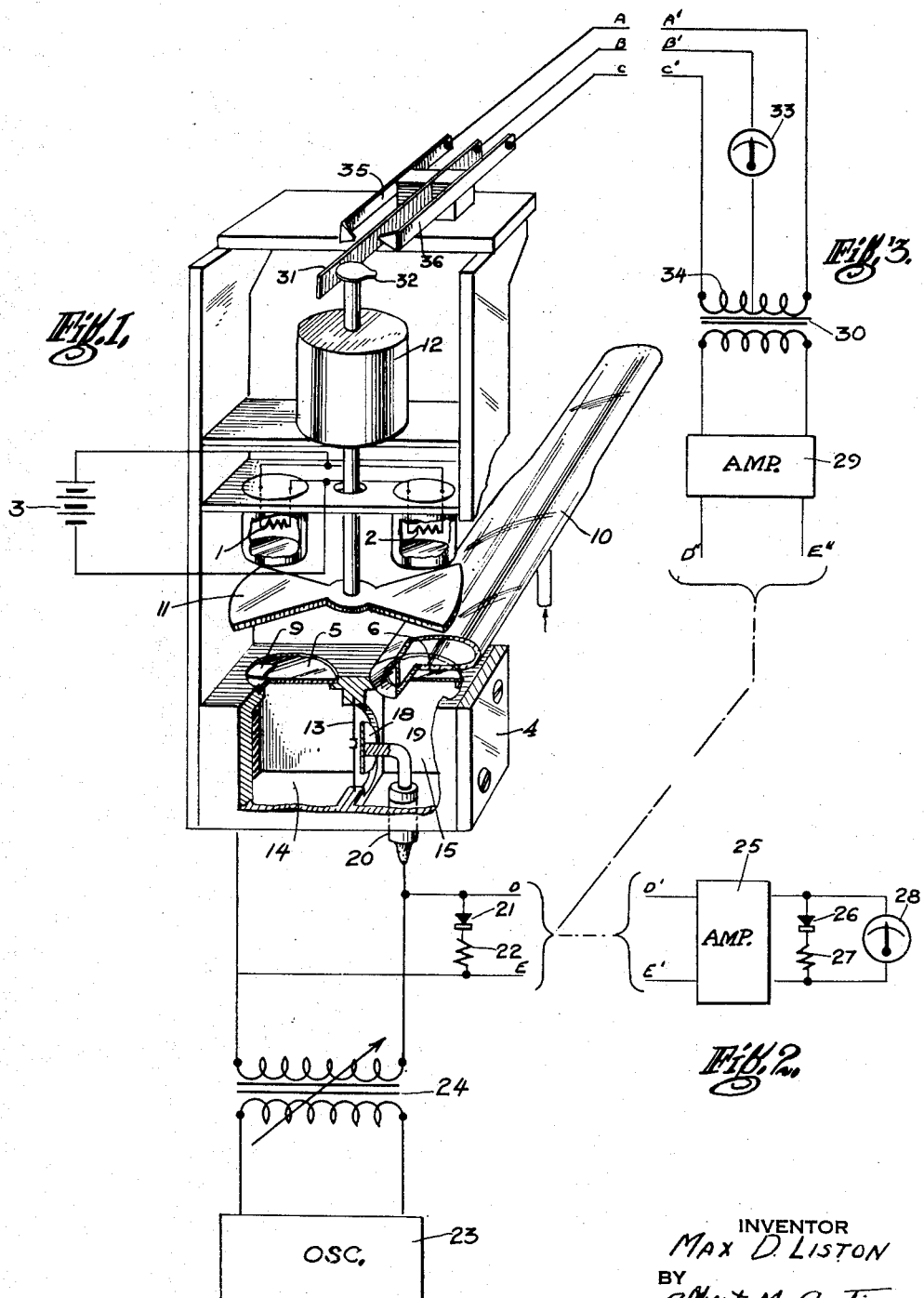

2,698,390

APPARATUS FOR THE ANALYZATION OF MIXTURES

Max D. Liston, Darien, Conn., assignor to Liston-Folb Instrument Co., Inc., Springdale, Conn., a corporation of Delaware Application April 2, 1951, Serial No. 218,864

13 Claims. (Cl. 250—43.5)

This invention relates to apparatus for the analyzation of mixtures and, more particularly, to apparatus for the detection and measurement of substances selectively responsive to infra-red rays.

Many substances, solid, liquid, and gaseous, exhibit the property of absorbing particular wave lengths of infra-red rays. By observing the effect of infra-red rays on a substance, and the effect of the same or similar rays which have been exposed to absorption in a sample of a mixture, the presence of said substance in said mixture can be detected and the amount of said substance in said sample determined.

Great difficulties are encountered, however, in the practical application of these principles. The effects, and the difference in effects, are of a low order of magnitude and, therefore, difficult to observe with assurance and to measure with exactitude. Extraneous influences may, and generally do, produce effects greater than those which it is desired to observe and measure. In many applications, results, to be useful and of practical value, must not only be reliable and accurate but must be obtained rapidly and, often, in rapid succession for successive samples. This is difficult to do and well-known means of observation and measurement are, in general, inadequate to meet these exacting requirements.

The present invention largely overcomes the difficulties which have heretofore hindered the exploitation of these valuable principles and it provides a means whereby determinations may be made under practical conditions with a rapidity, accuracy, and reliability that render it useful in a wide variety of applications in many arts. In the detection of noxious substances and in the determination of the amount of certain gases momentarily present in the human breath, this invention is applicable to the saving of human lives.

The accompanying drawings show, and the descriptions thereof describe, one embodiment of my invention in a form best adapted to a specific use. It must not be thought, however, that these drawings show the only form in which the invention may be embodied. The invention is applicable to so many embodiments that it would be impracticable to attempt to show them here. Other embodiments may be better adapted to other uses to which the invention may be applied. Equivalents may be substituted for any of the elements shown without departing from the spirit of the invention. The drawings are, therefore, illustrative only but, with the descriptions which follow, they will serve to give a clear understanding of the invention and the best manner of using it.

The drawings show the invention in an embodiment adapted to the determination of the amount of carbon dioxide present in successive samples of a gaseous mixture, such as the human breath. In these drawings, Fig. 1 shows, diagrammatically, the apparatus for exposing to infra-red rays samples of carbon dioxide gas and samples of the mixture to be tested, and also a portion of the electrical circuit for determining the effects, Fig. 2 shows an electrical indicating circuit, and Fig. 3 shows another electrical indicating circuit which may be used in place of the circuit of Fig. 2.

Referring to Fig. 1, parts 1 and 2 are similar sources of infra-red rays, each comprising an element radiating rays of suitable wave lengths, which may be, as shown, a filament electrically heated by the battery 3. The vessel 4, of any suitable material, is shown partly broken away to display its interior. It has two quartz windows 5 and 6 so disposed that rays from source 1 may penetrate to the interior of said vessel through the window 5, while rays from source 2 enter through the window 6. A quartz tube 10 is placed in the path of the rays passing from source 2 to window 6.

Quartz does not intercept infra-red rays of the wave lengths absorbed by carbon dioxide. In an instrument for the detection and measurement of some material other than carbon dioxide, all of the above-mentioned parts of quartz would be made of a material which does not intercept infra-red rays of wave lengths absorbed by said other material.

The opaque shutter 9 is adjustably disposed to obscure a portion of the window 5. The opaque shutter 11, rotated by motor 12, is so disposed that, in rotating, it intercepts the rays from sources 1 and 2 simultaneously and periodically. A thin metal diaphragm 13, with a pinhole in it, divides the interior of vessel 4 into two chambers 14 and 15. Said diaphragm as indicated is provided with a small opening, but such opening may be provided anywhere in vessel 4 to permit equalization of pressure in the chambers 14 and 15. Also, said pin hole is provided to prevent motion of the diaphragm on account of ambient temperature changes. Provision for any slow leak between chambers 14 and 15 in vessel 4 would be effective in producing the desired results. Vessel 4, which is hermetic, is filled with carbon dioxide. A metal plate 18 is rigidly supported, close to but not touching the diaphragm 13, by a conducting support 19 passing through the insulating bushing 20 and sealed therein. The diaphragm 13 and the plate 18 form a capacitor across which are connected the rectifier 21, of any suitable type, and the resistor 22 in series therewith. The circuit thus formed is supplied with alternating electrical energy of constant high frequency by the oscillator 23, which may be of any suitable type, through the variable transformer 24.

According to one arrangement, shown in Fig. 2, the tunable amplifier 25 is connected across the rectifier 21 and resistor 22. So as to function in the manner described, lines D and E may be connected to D' and E' respectively. The rectifier 26 and resistor 27, in series therewith, and the direct-current meter or other suitable indicating device 28 are connected across the output of said amplifier.

According to another arrangement, shown in Fig. 3, the amplifier 29, of any suitable type, is connected in place of amplifier 25. So as to function in the manner described, lines D'' and E'' of Fig. 3 may be connected to D and E respectively. The transformer 30 is connected across the output of amplifier 29. The swinging breaker contact 31 is actuated by the cam 32 on the shaft of motor 12 to contact the fixed contacts 35 and 36 alternately in synchronism with the rotation of shutter 11. Said swinging contact is connected through the meter 33, similar to meter 28, to the midpoint of the output winding 34 of transformer 30, wires A, B, C, being connected to A', B', C', respectively. Each of the fixed breaker contacts 35 and 36 is connected to one end of the winding 34.

Infra-red rays from the source 1, when not intercepted by the shutter 11, pass through the window 5 into the substance in chamber 14. Similarly, rays from source 2, when not intercepted, pass through the window 6 into the substance in chamber 15. Some of said rays are absorbed by said substance, heating it and causing it to expand. Pressure is thus created in chambers 14 and 15 during the periods when the rays from sources 1 and 2 are not intercepted by shutter 11. With none of said substance in tube 10, shutter 9 is adjusted until the pressure in chamber 14 equals that in chamber 15 and diaphragm 13 is undeflected. This will be indicated by meter 28, or meter 33, as will be apparent from the description which follows.

If, now, a mixture containing some of the substance which is in chambers 14 and 15 is introduced into tube 10, some of the rays from source 2 will be absorbed by that substance in tube 10 and thereby prevented from entering chamber 15. The pressure in said chamber will thereby be lowered and diaphragm 13 is deflected by the difference in pressure in the two chambers. The pinhole in said diaphragm does not prevent the rapid difference of pressure which arises during each period when the rays from sources 1 and 2 are not intercepted by shutter 11. The deflection of diaphragm 13 under the circumstances is an indication of the presence of and a measure of the amount of said substance in tube 10.

By the deflection of diaphragm 13, the capacity of the capacitor formed by said diaphragm and plate 18 is changed. This change occurs periodically as determined by the rotation of shutter 11. The energy supplied by oscillator 23, through transformer 24, is thereby modulated and a pulsating current, at the frequency of said modulation, is produced through rectifier 21 and resistor 22.

Assuming, now, that Fig. 2 is used, amplifier 25 is tuned to the frequency of said modulation. The output of said amplifier produces a pulsating direct current through rectifier 26 and resistor 27 at the frequency of said modulation, which is indicated by meter 28. Said meter, therefore, indicates the deflection of diaphragm 13 and the extent thereof, thereby indicating the presence and amount of the particular substance in chambers 14 and 15 which is present in tube 10.

When Fig. 3 is used in place of Fig. 2, the operation is similar but not the same. Amplifier 29 amplifies the modulation effect through rectifier 21 and resistor 22 and applies the amplified effect to transformer 30, producing an alternating current in the windings thereof. Cam 32, actuating the swinger 31 to contact the fixed contacts 35 and 36 alternately in synchronism with the rotation of shutter 11, connects meter 33 across the left-hand portion and the right-hand portion of winding 34 alternately. A pulsating direct current is thereby produced through meter 33 at the frequency of the incidence of the rays from sources 1 and 2 upon the substance in chambers 14 and 15, which is indicated by said meter. Meter 33, therefore, gives as indication similar to and having the same significance as that given by meter 28.

In the circuits of Fig. 2, rectification is performed on positive or negative half-cycles of the alternating electrical energy as they occur, but in the circuits of Fig. 3, the rectification is performed on both positive and negative half-cycles of alternation and in synchronism with the incidence of the infra-red rays on the contents of chambers 14 and 15.

In either case, the relation between the inductance and the capacitance in the circuit comprising the capacitor formed by diaphragm 13 and plate 18 and the output winding of transformer 24 is made such that said circuit is nearly but not quite at resonance with the frequency supplied by oscillator 23, and is in the region of resonant response where any change in capacitance produces a greater-than-proportional change in potential across the capacitor. A strong signal is thereby produced by a small deflection of diaphragm 13. The variable transformer 24 provides a convenient means for adjustment of the relation of the inductance and the capacitance in said circuit for the working range of the instrument.

Various modifications in the arrangements shown and described are possible. One source of infra-red rays, instead of two, may, of course, be used, if desired. Also, but one body of material, in chamber 15, responsive to said rays, need be employed, the pressure in said chamber being measured with and without a sample of the mixture to be tested in tube 10. The difference in the two readings would indicate the presence and amount of said material in tube 10. However, the employment of two bodies of material and the measurement of the difference of pressures, as shown and described, is preferable.

It is evident, also, that the capacitor formed by diaphragm 13 and plate 18 may be made responsive to changes in temperature in the material in chambers 14 and 15, rather than to changes in pressure in said chambers, and that said chambers may be filled with a liquid responsive to infra-red rays or with a liquid containing material responsive to said rays. There are, in fact, many ways in which the invention may be employed which will be apparent to those skilled in the art.

The terms and expressions which I have used to describe my invention are illustrative and it is not intended, by the use of such terms and expressions, to exclude equivalents of or alternates for the parts, arrangements, and actions described but, on the contrary, to include therein any and all parts, arrangements, and actions that may be employed without departing from the spirit of the invention.

What is claimed is:
1. In combination, a source of infra-red rays, two bodies of material responsive to said rays, means for exposing said rays to absorption before reaching one of said bodies, means for modulating the incidence of said rays on said bodies, means for equalizing the pressure for long time changes due to ambient temperatures, and means for indicating the difference in response of said two bodies to said modulated rays comprising a variable capacitor responsive to said bodies, a source of alternating electrical energy, means responsive to said capacitor for potential modulation of said energy, and detector means for indicating the value of said latter modulation.

2. In combination, a source of infra-red rays, a body of material responsive to said rays, means for exposing said rays to absorption before reaching said body, means for modulating the incidence of said rays on said body, means for equalizing the pressure for long time changes due to ambient temperatures, and means for indicating the response of said body to said modulated rays comprising a variable capacitor responsive to said body, a source of fixed frequency alternating electrical energy, an inductance-capacitance circuit resonantly responsive to said alternating energy and to said capacitor for potential modulation of said energy, and detector means responsive to said circuit for indicating the value of said modulated energy.

3. In combination, a source of infra-red rays, two bodies of material responsive to said rays, means for exposing said rays to absorption before reaching one of said bodies, means for modulating the incidence of said rays on said bodies, means for equalizing the pressure for long time changes due to ambient temperatures, and means for indicating the difference in response of said two bodies to said modulated rays comprising a variable capacitor responsive to said bodies, a source of alternating electrical energy, an inductance-capacitance circuit resonantly responsive to said alternating energy and to said capacitor for modulating said energy, and rectifier means responsive to said circuit for indicating the value of said modulated energy.

4. In combination, a source of infra-red rays, a body of material responsive to said rays, means for exposing said rays to absorption before reaching said body, means for modulating the incidence of said rays on said body, means for equalizing the pressure for long time changes due to ambient temperatures, and means for indicating the response of said body to said modulated rays comprising a variable capacitor responsive to said body, a source of fixed frequency alternating electrical energy, means responsive to said capacitor for potential modulation of said energy, means for rectifying said modulated energy, and indicating means responsive to said rectifying means at the frequency of said modulation of said energy.

5. In combination, a source of infra-red rays, two bodies of material responsive to said rays, means for exposing said rays to absorption before reaching one of said bodies, means for modulating the incidence of said rays on said bodies, pressure equalizing means intermediate said two bodies, and means for indicating the difference in response of said two bodies to said modulated rays comprising a variable capacitor responsive to said bodies, a fixed frequency source of alternating electrical energy, means responsive to said capacitor for modulating said energy, means for rectifying said modulated alternating energy, and indicating means responsive to said rectifying means at the frequency of the modulation of said energy.

6. In combination, a source of infra-red rays, a body of material responsive to said rays, means for exposing said rays to absorption before reaching said body, shutter means for modulating the incidence of said rays on said body, pressure equalizing means for said body of material for equalizing pressure changes due to ambient temperature, and means for indicating the response of said body to said modulated rays comprising a variable capacitor responsive to said body said capacitor consisting of a diaphragm and an adjacent plate, a source of alternating electrical energy, means responsive to said capacitor for modulating said energy, means for rectifying said modulated alternating energy in synchronism with said modulation of the incidence of said rays, and indicating means responsive to said rectifying means.

7. In combination, a source of infra-red rays, two bodies of material responsive to said rays, means for exposing said rays to absorption before reaching one of said bodies, means for modulating the incidence of said rays on said bodies, pressure equalizing means intermediate said two bodies, and means for indicating the difference in response of said two bodies to said modulated rays comprising a variable capacitor responsive to said bodies, a source of alternating electrical energy of high frequency, means responsive to said capacitor for modulating said energy, means for rectifying said modulated alternating energy in synchronism with said modulation of the incidence of said rays, and indicating means responsive to said rectifying means.

8. In combination, a source of infra-red rays, a body of material responsive to said rays, means for exposing said rays to absorption before reaching said body, means for successively modulating the incidence of said rays on said body, pressure equalizing means for said body of material for equalizing pressure changes due to ambient temperature, and means for indicating the response of said body to said modulated rays comprising a variable capacitor responsive to said body, said capacitor consisting of a diaphragm and an adjacent plate, a source of alternating electrical energy, an inductance-capacitance circuit resonantly responsive to said alternating energy and to said capacitor for modulating said energy, means for rectifying said modulated alternating energy in synchronism with said modulation of the incidence of said rays, and indicating means responsive to said rectifying means.

9. In combination, a source of infra-red rays, two bodies of material responsive to said rays, means for exposing said rays to absorption before reaching one of said bodies, means for modulating the incidence of said rays on said bodies, and means for indicating the difference in response of said two bodies to said modulated rays comprising a variable capacitor responsive to said bodies, a source of alternating electrical energy of constant high frequency, an inductance-capacitance circuit resonantly responsive to said alternating energy and to said capacitor for modulating said energy, means for rectifying said modulated alternating energy in synchronism with said modulation of the incidence of said rays, and indicating means responsive to said rectifying means.

10. In combination, a source of infra-red rays, a body of material responsive to said rays, means for exposing said rays to absorption before reaching said body, means for modulating the incidence of said rays on said body, pressure equalizing means for said body of material for equalizing pressure changes due to ambient temperature, and means for indicating the response of said body to said modulated rays comprising a diaphragm and a fixed support therefor forming a variable capacitor responsive to said body, a source of alternating electrical energy of constant high frequency, an inductance-capacitance circuit resonantly responsive to said alternating energy and to said capacitor for modulating said energy, means for rectifying said modulated alternating energy, and indicating means responsive to said rectifying means.

11. In combination, a double source of infra-red rays, two bodies of material responsive to said rays, means for exposing said rays to absorption before reaching one of said bodies, means for modulating the incidence of said rays on said bodies, pressure equalizing means intermediate said two bodies, and means for indicating the difference in response of said two bodies to said modulated rays comprising a variable capacitor responsive to said bodies, a source of alternating electrical energy, transformer means in connection therewith, an inductance-capacitance circuit resonantly responsive to said alternating energy and to said capacitor for modulating said energy, means for rectifying said modulated alternating energy, and indicating means responsive to said rectifying means.

12. In combination, a source of infra-red rays, a body of material responsive to said rays, means for exposing said rays to absorption before reaching said body, means cyclically interrupting said rays, means equalizing the pressure to compensate for ambient temperature changes, capacitive means responsive to pressure changes in said body of material, inductance means connected to said capacitive means to form a resonant circuit, a fixed frequency alternating current source coupled to said resonant circuit, said resonant circuit being tuned to a frequency differing from the source frequency and in the region where a relatively small change in said capacitive means produces a greater than proportional change in potential across said capacitive means, and detecting and amplifying means connected to said resonant circuit indicating changes in said body of material.

13. In combination, a source of infra-red rays, a body of material responsive to said rays, means for exposing said rays to absorption before reaching said body, means cyclically interrupting said rays, means equalizing the pressure to compensate for ambient temperature changes, capacitive means responsive to pressure changes in said body of material, inductance means connected to said capacitive means to form a resonant circuit, a fixed frequency alternating current source coupled to said resonant circuit, said resonant circuit being tuned to a frequency differing from the source of frequency and in the region where a relatively small change in said capacitive means produces a greater than proportional change in potential across said capacitive means, detecting and amplifying means connected to said resonant circuit indicating changes in said body of material, and rectifying means synchronized with said interrupting means and connected to said amplifying means so that a direct current potential is obtained which is proportional to the absorption.

References Cited in the file of this patent

UNITED STATES PATENTS

| Number | Name | Date |
|---|---|---|
| 2,403,915 | Evans | July 16, 1946 |
| 2,525,445 | Canada | Oct. 10, 1950 |
| 2,555,327 | Elliott | June 5, 1951 |
| 2,573,870 | Pfund | Nov. 6, 1951 |

OTHER REFERENCES

Journal of Scientific Instruments, December 1946, page 293.